United States Patent [19]

Matsumoto

[11] Patent Number: 4,692,797
[45] Date of Patent: Sep. 8, 1987

[54] PHOTOGRAPHIC PRINTING SYSTEM

[75] Inventor: Fumio Matsumoto, Tokyo, Japan

[73] Assignee: Fuji Photo Film Co., Ltd., Kanagawa, Japan

[21] Appl. No.: 802,221

[22] Filed: Nov. 26, 1985

[30] Foreign Application Priority Data

Dec. 7, 1984 [JP] Japan .............................. 59-258753
Apr. 8, 1985 [JP] Japan ................................ 60-73794
Aug. 26, 1985 [JP] Japan .............................. 60-185791

[51] Int. Cl.$^4$ ...................... G03B 27/73; H04N 1/46
[52] U.S. Cl. ......................................... 358/76; 355/68
[58] Field of Search ............... 358/75, 76, 80; 355/18, 355/68

[56]          References Cited
         U.S. PATENT DOCUMENTS

| 4,310,848 | 1/1982 | Carter | 358/76 |
| 4,531,150 | 7/1985 | Amano | 358/76 |
| 4,577,219 | 3/1986 | Klie | 358/75 |
| 4,610,537 | 9/1986 | Matsumoto | 355/68 |
| 4,623,246 | 11/1986 | Kubota | 355/68 |

*Primary Examiner*—Howard W. Britton
*Attorney, Agent, or Firm*—Wenderoth, Lind & Ponack

[57]              ABSTRACT

A photographic printing system includes a circuit or device for dividing a picture information of a picture image on an original film into a plurality of information regarding the divided picture element and storing the information, a circuit for correcting density and color of the picture to be printed, and a display unit for displaying the picture information thereon before and after the density and color correction. The printing condition of the main object can be desirably obtained by designating the position of the portion to be photographed by means of a touch panel, for example. The system further includes a circuit for determining or correcting the printing exposure amount of the picture image to be printed in accordance with the characterized data or information of the picture displayed on the display unit.

21 Claims, 28 Drawing Figures

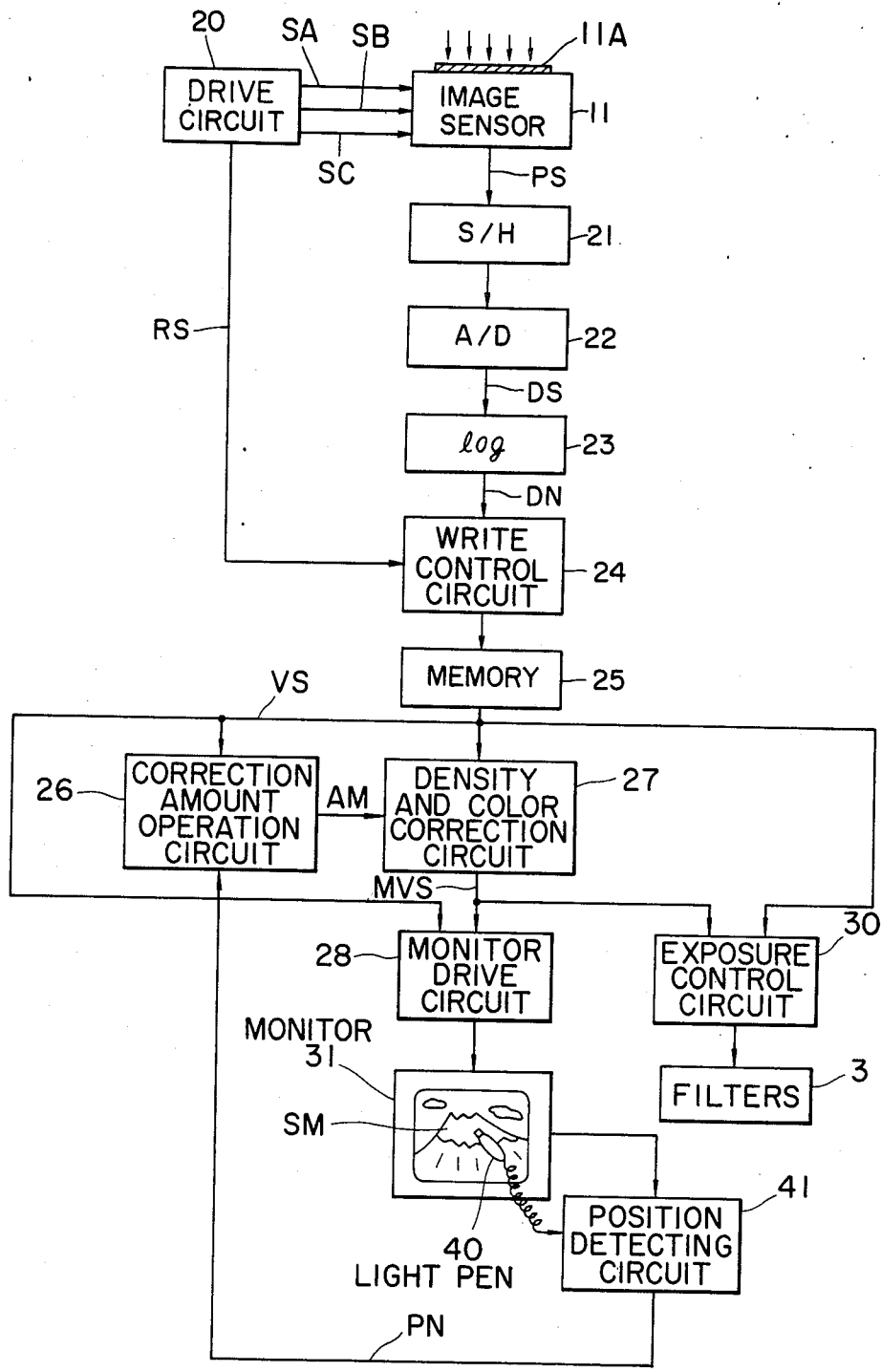

72 FILTER
73 ELECTRODE PLATES
74 ELECTRODE PLATES
75 SUBSTRATE

FIG. 23A
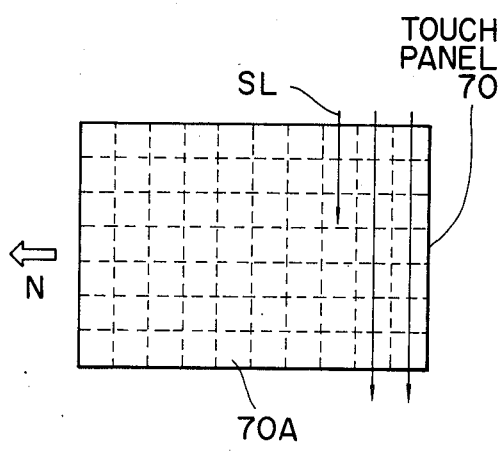
FIG. 23B
FIG. 24
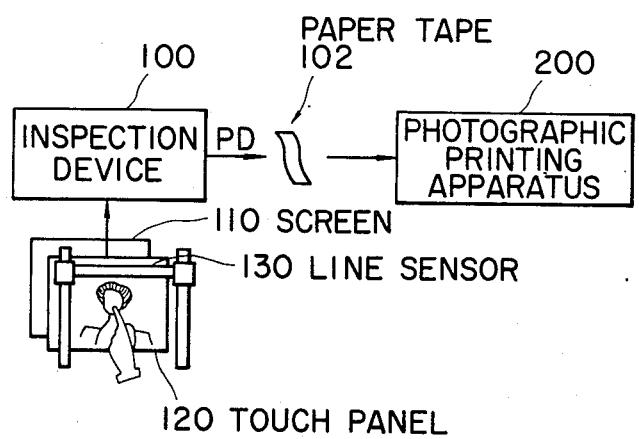

1

PHOTOGRAPHIC PRINTING SYSTEM

BACKGROUND OF THE INVENTION

This invention relates to a photographic printing system in which picture information of an original film such as a negative film is subjected to light measurement and is then divided into picture element information and stored into a memory. The picture information are displayed on a monitor after the correction of the picture or density and color thereof and are then printed with a constant density of the main object to be photographed designated by an external means.

FIG. 1 shows a schematic diagramatic view of a system in which a picture information detecting device 10 is assembled into a conventional photographic printing apparatus to thereby divide the picture information of the original film such as a negative film and to store the divided picture elements. A negative film 2 delivered to a printing portion along a negative film carrier 1 are lit by a light source 4 through three complementary color (yellow Y, magenta M and cyan C) filters 3 and three primary color (blue B, green G and red R) filters 9 which are alternatively inserted into the filters 3 for collecting the picture information. The transmitted light through the filters 3 reaches a photographic paper 7 through a lens unit 5 and a black shutter 6. The photographic paper 7 is wound around a supply reel 7A and wound up around a take-up reel 7B in synchronism with the delivery and stoppage of the negative film 2 and photo sensors 8, such as photodiodes, for detecting picture density information of the three primary colors of blue, green and red are arranged near the lens unit 5 of the negative film 2. The photographic printing process in a prior technique is carried out by a detected signal from the photo sensors 8. The picture information detecting device 10 is disposed near the negative film 2 in an inclined manner with respect to the light axis LS of the light source 4 and the negative film 2, and, in front of a two-dimensional image sensor 11, a lens unit 12 is arranged for focussing the transmitted light through sustantially the central portions of the filters 9 and 3 and the negative film 2. A substrate 13 for setting processing circuits consisting of integrated circuits and so on for processing the picture is mounted on the rear surface of the unitted detecting apparatus.

The two-dimensional image sensor 11 comprises, as shown in FIG. 2, an image pick-up portion 11A for optically picking up the picture, a storage portion 11B for storing charges transferred from the pick-up portion 11A, and an output register 11C for outputting the charge stored in the storage portion 11B. The two-dimensional image sensor 11 of the construction described above operates to perform photo-electric conversion of the picture information of the two-dimensional area by controlling the drive signals SA to SC from a drive circuit, not shown, so as to thereby output an analog-type picture signal PS from the output register 11C. FIG. 3 shows one example of a circuit construction to be mounted on the substrate 13, and referring to FIG. 3, the image sensor 11 is operated by the drive signals SA to SC from a drive circuit 20. The light irradiated on the image pick-up portion 11A of the image sensor 11 is outputted as a picture signal PS from the output register 11C and is then sampled and held in a sample-and-hold circuit 21 with a predetermined sampling interval. The thus obtained value is converted into a digital signal DS by A/D (analog-to-digital) converter 22. The digital signal DS from the A/D converter 22 is inputted into a logarithmic circuit 23 to effect the logarthmic conversion of the digital signal DS, and after the conversion into a density signal DN, the density signal DN is writen into a memory 25 through a write control circuit 24.

According to the circuit construction of the type described above, when it is necessary to perform a normal printing operation, the filters 9 are offset from the light axis LS as shown in FIG. 1, and the transmitted light of the negative film 2 delivered and carried on the printing portion is detected by the photo sensors 8. The filters 3 are adjusted in accordance with the picture signals regarding the primary colors of B, G and R, respectively and the black shutter 6 is opened to expose the light on the photographic paper 7 with the predetermined exposure amount.

When it is necessary to detect the picture information of the picture elements and store them, respectively, the filters 3 are offset from the light axis LS as shown in FIG. 4, the respective filters 9 of the colors B, G and R are alternatively inserted across the light path from the light source 4 so as to thereby transmit the B, G and R light in the white light from the light source 4 to project them on the negative film 2, whereby the picture information of the yellow, magenta and cyan layers corresponding to the B, G and R colors, respectively are inputted into the image sensor 11. Since the two-dimensional image sensor 11 receives the transmitted light, through the lens system 12, of the negative film 2 carried on the printing portion by applying the predetermined drive signals SA to SC from the drive circuit 20 to the image sensor 11, the image sensor 11 divides the entire surface of the picture of the negative film 2 into a number of ordered small picture elements 2A and scan all of the picture elements of the negative film 2 subsequently according to the scanning line SL as shown in FIG. 5A. After the completion of the scanning operation, the picture signals PS are sequentially outputted from the output register 11C of the image sensor 11, and the picture PS signals are then sampled and held by the sample-and-hold circuit 21, so as to thereby convert the sampled value to the digital signal DS by the A/D converter 22. The digital signals DS from the A/D converter 22 are logarithmically converted by the logarithmic converting circuit 23 to obtain the density signals DN, which are then stored into the memory 25 with the arrangement corresponding to the picture elements 2A shown in FIG. 5B and with the density digital values of the negative film 2 by the control of the write control circuit 24. Furthermore, even if the picture information detecting device 10 with an inclined light axis is attached to a generally used photographic printing apparatus, a correct image with no deformation of the negative film 2 can be formed on the two-dimensional image sensor 11 because the light receiving surface of the image sensor 11 is in parallel with the negative film 2. This fact applies "camera adjustments" in a photographing technique, in which in order to simplify the mechanism of the printing device, the printing device is intentionally constructed so that the light axes of a lens unit for the two-dimensional image sensor 11 do not intersect with each other at substantially the central portion of the picture surface and the picture information can correctly be detected. After the digital values of the respective picture elements of the negative film 2 or the density values of the picture elements regarding the respective three primary colors have been stored in the memory 25, the digital values of the respective picture elements of the negative film 2 can be read out from the memory 25 for practical use. Accordingly, if the density values shown in FIG. 5B with respect to the three primary colors of blue, green and red have preliminarily been stored in the memory, the stored density values can be utilized as values for determining the exposure amount or correction amount in a photographic printing operation by optionally reading out the stored values and processing the operation thereof and the like. In addition, since the picture information detecting device 10 is constructed so as to detect the picture information of the picture elements of the entire picture surface, the precise and correct picture information detection can be performed.

In a photographic printing system of the type mentioned above, the picture information of an original film such as a negative film can be stored by dividing the picture into a numerous number of picture elements, so that the precise and correct information can be obtained as photographic picture information, and in addition, it is possible to precisely decide the exposure amount or correction amount for the photographic printing process from the thus obtained information. However, an actually printed result can be obtained only by performing the actual printing operation even if the exposure amount or the correction amount were thus decided, so that if the actually printed photograph is insufficient, the printing operation will have to be performed again.

In another aspect, with a photographic printing system aiming at processing a large number of negative films in a concentrated manner, the original film to be printed as shown in FIG. 6 is preliminarily examined by an inspection device 100. In this inspection, when it is determined that the printing amount obtained by a large area transmittance density (LATD) should be corrected, correction data is written in a paper tape 102 by operating the density key of a keyboard 101 and the data on the paper 102 is given to a photographic printing apparatus 200 to correct the exposure amount, thus carrying out properly the photographic printing operation. In actual printing operation, however, the correction operation by means of the keyboard is 101 considerably difficult for an operator with less experience and may include miss-determination. This is based on the fact that the correction amount is determined by the operator by the determination of the area balance between the density of the main object of the image on the original film and the background thereof.

SUMMARY OF THE INVENTION

An object of this invention is to eliminate defects or disadvantages encountered to the prior art technique and to provide a photographic printing system in which an original film such as negative film is lit and the thus obtained information regarding the picture image on the negative film is divided into those regarding the divided picture elements which are then stored. Picture information of the picture to be printed after and before density and color correction is displayed on a monitor so as to correct the picture information by viewing the displayed picture on the monitor and so as to thereby obtain a stabilized printing condition of a designated position such as main object of the picture to be photographed.

Another object of this invention is to provide a photographic printing system in which a picture of an original film such as negative film is optically displayed on a viewer and a printing condition of a designated position of the main object of the picture designated on the viewer is controlled to be always suitable.

A further object of this invention is to provide a photographic printing system in which a picture of an original film such as negative film is optically displayed on a viewer, and a picture projected on the viewer is divided into a plurality of picture elements as picture information. The divided picture elements are subjected to light measurement to obtain a printing condition of a position regarding such as a main object of the picture designated on the viewer which is controlled to be always suitable for printing operation.

For achieving these and other objects, in one aspect, according to this invention, there is provided a photographic printing system of the type in which a picture image of an original film lit by a light source is printed on a photographic paper comprising a two-dimensional image sensor for receiving a transmitting light through or reflected light from the picture image on the original film, a signal processing circuit for processing and storing a signal regarding the picture image from the two-dimensional image sensor, a correction amount operation circuit for extracting characterized information of the original film from data of the picture image stored in the signal processing circuit and for calculating the density and color correction amount of the picture image to be printed, a density and color correction circuit for correcting the picture image data stored in the signal processing circuit in accordance with the calculated density and color correction amount, a monitor for displaying a picture in response to the picture image data after the correction of the density and color correction circuit, a device for designating a position of the picture displayed on the monitor, and a density and color recorrection circuit for recorrecting the picture data of the density and color correction circuit so as to change the density or lit amount of the picture displayed on the monitor to a predetermined value, whereby a photographic printing operation is performed with the recorrected picture data of the density and recorrection circuit.

In another aspect, there is provided printing system of the same type as described above comprising a two-dimensional image sensor for receiving a transmitting light through or reflected light from the picture image on the original film, a signal processing circuit for processing and storing a signal regarding the picture image from the two-dimensional image sensor, a correction amount operation circuit for extracting characterized information of the original film from data of the picture image stored in the signal processing circuit and for calculating the density and color correction amount of the picture image to be printed, a density and color correction circuit for correcting the picture image data stored in said signal processing circuit in accordance with the calculated density and color correction amount, a monitor for displaying a picture in response to the picture image data after the correction of the density and color correction circuit, a device for designating one or more than one points or area consisting of subsequent points which represent the characterized shape of a displayed picture in accordance with the picture data before and after the correction of the density and color correction circuit, and a density and color recorrection circuit for recorrecting the picture data of the density and color correction circuit so as to change the density or lit amount of the displayed picture of the area designated by the area designating device to a predetermined value, whereby a photographic printing operation is performed with the recorrected picture data of the density and color recorrection circuit.

In a further aspect of this invention, there is provided a photographic printing system of the type described hereinabove comprising a printing amount determining device for storing data regarding the original film which is subjected to light measurement with respect to picture elements obtained by dividing the picture of the original film and for extracting characterized information of the original film from the stored data so as to thereby determine the printing exposure amount, a unit for optically displaying the picture image of the original film, a touch panel unit layered on a picture surface of the display unit for outputting position information regarding a position of the displayed picture touched by an operator, a unit for correcting the printing exposure amount in accordance with the stored data corresponding to the position information, and a unit for printing the original film with an exposure amount determined by the printing exposure correction unit.

In a still further aspect of this invention, there is provided a photographic printing system of the type comprising an inspection device for inspecting picture image of an original film and a photographic printing device for printing the picture of the original film on a photographic paper after the inspection procedure of the inspection device, the inspection device being provided with a unit for optically displaying the picture image of the original film and a touch panel unit disposed on a picture surface of the display unit for outputting position information regarding a position of the displayed picture touched by an operator, and the photographic printing device being provided with a printing exposure determining unit for extracting characterized information of the picture divided into picture elements of the original film which is subjected to light measurement so as to thereby determine a printing exposure amount, a unit for correcting the printing exposure amount in response to the position information, and a unit for printing the picture of the original film with the printing exposure amount determined by the printing exposure correction unit.

In a still further aspect of this invention, there is provided a photographic printing system of the type in which a picture image of an original film lightened by a light source is printed on a photographic paper, comprising a display unit for optically displaying the picture image of the original film, a touch panel unit layered on a picture surface of the display unit for outputting position information of a position of the displayed picture designated by an operator, a printing exposure amount determining unit for storing picture informations regarding picture elements obtained by dividing the picture on the picture surface on the display unit into an ordered arrangement by a light measurement manner and for obtaining the printing exposure amount of the picture from the stored data regarding the picture elements, the printing exposure amount determining unit comprising a line sensor for receiving a picture image projected on the display unit, a driving circuit for driving the line sensor, a scanning mechanism located to be movable along the display unit, and a signal processing circuit for sequentially processing and storing picture signals from the line sensor in response to a moving speed of the line sensor, an exposure amount recorrection unit for extracting characterized information of the picture from the stored data corresponding to the position information and recorrecting the printing and exposure amount, and a printing unit for printing the original film with the exposure amount determined by the exposure amount recorrection unit.

In a still further aspect of this invention, there is provided a photographic printing system of the type comprising an inspection device for detecting a picture image of an original film and a photographic printing device for printing the original film or a photographic paper, the inspection device being provided with an exposure amount recorrection unit for extracting characterized information of the displayed picture from the stored data corresponding to the position information, the photographic printing device being provided with a printing unit for printing the displayed picture on the photographic paper with a recorrected exposure amount determined by the exposure amount recorrection unit.

The nature, utility, and further features of this invention will be more clearly apparent from the following detailed description with respect to the embodiments of this invention when read in conjunction with the accompanying drawings, briefly described hereunder.

BRIEF DESCRIPTION OF THE DRAWINGS

In the accompanying drawings:

FIG. 7 shows a circuit diagram of one embodiment according to this invention;

FIGS. 23A and 23B are views for showing a relationship between the division of a negative film into picture elements and memorized data; and FIG. 24 shows a schematic diagram of another example according to this invention.

DESCRIPTION OF THE PREFERRED EMBODIMENTS

Figure 1:
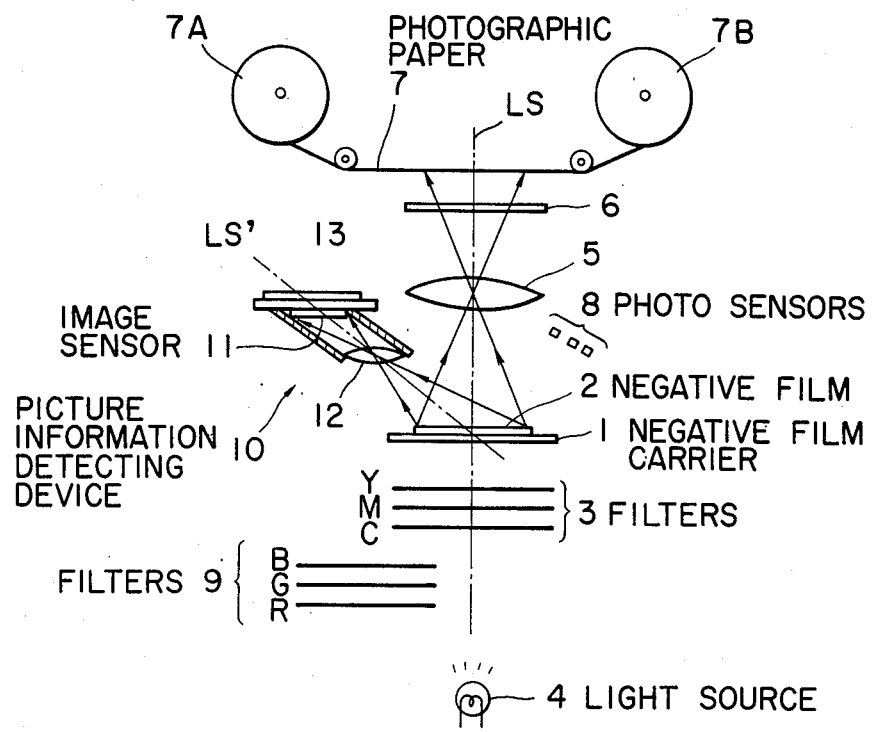
FIG. 1 is a schematic view of a photographic printing system of conventional type to which a picture information detecting device is attached.
Figure 2:
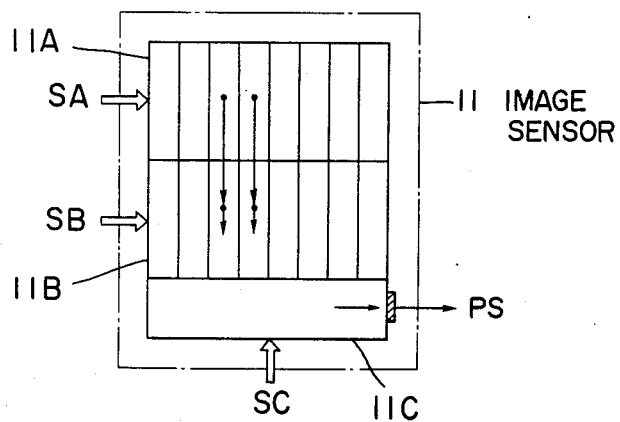
FIG. 2 shows a construction for showing function of a two-dimensional image sensor to be used for this invention.
Figure 3:
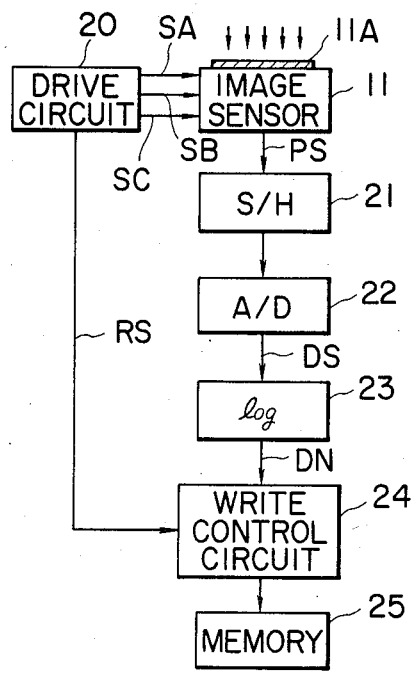
FIG. 3 shows a block diagram of a control system for the two-dimensional image sensor shown in FIG. 2.
Figure 4:
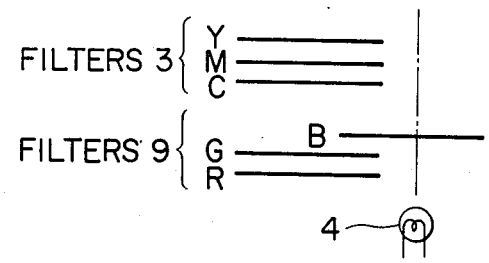
FIG. 4 shows an arrangement of filters for color complement and filters for adapting picture information, which are in used condition.
Figures 5A, 5B:
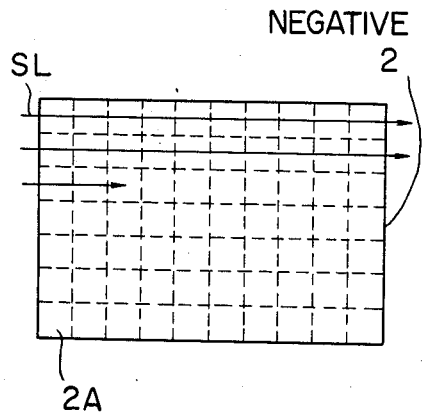
FIGS. 5A and 5B are views for showing a relationship between the division of an original film into picture elements and memeorized data, respectively.

FIG. 7 is a block diagram of a circuit construction of one embodiment according to this invention, which is shown with reference to FIG. 3 and in which the construction of the optical system is substantially the same as that shown in FIG. 1.

Referring to FIG. 7, the picture signal VS stored in a memory 25 is read out and inputted into a correction amount operation circuit 26, a density and color correction circuit 27, a monitor drive circuit 28 and an exposure control circuit 30. Into the density and color correction circuit 27 is inputted an automatic correction amount AM from the correction amount operation circuit 26, whereby the density and the color of the picture signal VS are amended and then inputted into the monitor drive circuit 28 as a correction picture signal MVS to display the signal on a monitor 31 such as a cathode ray tube (CRT). The picture displayed on the monitor 31 is based on a noncorrected or corrected picture data in the correction amount operation circuit 26, and in a case where the display picture before or after the correction represents a specific scene such as a backlighted scene in which a difference in light exists between a main object to be photographed and the background, there is a case where it is necessary to further lighten or darken the object by applying further correction. For the reason described above, according to this invention, a light pen 40 designates the main object SM in the displayed picture and the designated position is detected by a position detecting circuit 41. A signal PN representing the detected position is inputted into the correction amount operation circuit 26, and the density and color correction circuit 27 operates so as to correct the whole picture data so that the picture data of the detected position is in accordance with the predetermined density data. The corrected picture signal MVS thus corrected by the density and color correction circuit 27 with the main object to be photographed is inputted into the exposure control circuit 30 to adjust the filters 3 so as to thereby carry out a proper printing exposure corresponding to the corrected picture.

In the meantime, since the corrected picture signal MVS is inputted into the monitor drive circuit 28, through which the signal is displayed on the monitor 31, the position correction can be repeated similarly by designating the position with the light pen 40 under the observation of the displayed picture. The negative film 2 is generally fixed and the same picture element information is outputted from the image sensor 11 with a constant time interval, generally several tens of milliseconds, so that a relatively inexpensive real-time processing system can be constituted without using the memory 25 of an expensive frame memory by carrying out the operation processing and output displaying in synchronism with the outputted picture element information. In that case, however, it is impossible to divide the monitor 31 and combine the divided picture elements. The monitor drive circuit 28 includes a D/A (digital-to-analog) converter and the picture on the monitor 31 can be displayed with full-colors of B, G and R (blue, green and red colors). In a case where it is desirable to observe the picture as to only the density information, the density information constituted by the white and black colors can of course be obtained by suitably combining the color information of B, G and R. According to this construction, when the picture information of each of the respective B, G and R colors of the original film is stored in the memory 25 in substantially the same manner as disclosed above, the picture information is transferred from the memory 25 into the correction amount operation circuit 26 as a picture signal VS of each of the respective colors of B, G and R to extract specific information such as the maximum and the minimum densities and the contrast of the picture, and thereafter the density and the color correction amount AM can be calculated or operated by the manner or method disclosed in Japanese Laid-open Patent (KOKAI) Nos. 23936/1977 and 28131/1979. The automatic correction amount AM is inputted into the density and color correction circuit 27, in which the density and color correction of the picture signal VS is made on the basis of the automatic correction amount AM so as to thereby form the corrected picture signal MVS, which in turn is inputted into the monitor drive circuit 28 and is then displayed on the monitor 31 as a corrected picture.

In general, it is desirable to constitute the picture on the monitor 31 with a numerous number of picture elemnents (hundreds of thousands of pixels) to clearly display the picture on the monitor 31. There is some limit to the operating time to operate the correction amount and in case the number of the picture elements is more than a constant value (several hundred pixels), since that fact is not much related to the correction performance, a large number of picture elements will not be required. For this reason, as the data required for the operation, it is desirable to process the operation in which the optional picture element data is gathered and compressed to obtain the divided information or the data is properly thined by, for example, a method disclosed in Japanese Patent Publication No. 33723/1984 in which the picture element data is made according to the picture surface division data.

With the displaying operation described here, because the corrected picture on the monitor 31 just displays a picture to be printed, an operator instructs, in the observation of the displayed picture, that the picture provides no correction, and otherwise, he inputs the position to be corrected (usually the main object to be photographed) by the light pen 40 when the displayed picture subjected to the automatic correction amount AM includes some defective point(s). In that case, the density and color correction circuit 27 operates to add or subtract a correction amount MM to or from the automatic correction amount AM to set the density of the designated position of the picture to the predetermined amount, and the thus corrected result is displayed on the monitor 31 through the monitor drive circuit 28. Accordingly, by repeating such a correction procedure with the light pen 40 an optional picture can be obtained with the density suitable for the desired printing operation and one can confirm the fact that the desired picture is displayed on the monitor 31. In another preferred picture correction method, a reference density and a color step may be displayed on the monitor so as to thereby designate and correct the desired density and color with the light pen.

The corrected picture signal MVS finally determined by the manner described above is inputted into the exposure control circuit together with the picture signal from the memory 25, and the filters 3 are then adjusted by the exposure control circuit 30 so that a photographic picture with the same density and color as those of the corrected picture displayed on the monitor 31 can be printed and the printing and exposing procedures are performed under these conditions.

Figure 8:
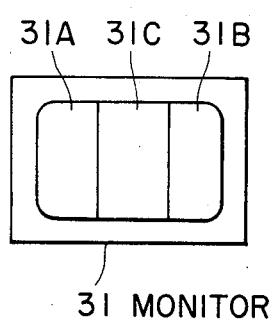
FIG. 8 shows a monitor shown in FIG. 7 in which the surface is divided into elements.

Although the negative film 2 is sensed with respect to the B, G and R colors at a photographing time and subjected to the color development to Y, M and C colors, since common logarithmic values of the inverse numbers of anti-logarithmic values of the light amounts of the Y, M and C colors are stored in the memory 25 by a logarithmic converting circuit 23, the B, G and R colors of the object to be photographed which are the complementary colors of the Y, M and C colors are stored in the memory 25. In case the picture signal VS or corrected picture signal MVS are displayed on the monitor 31, it is not necessary to newly invert the data. Generally speaking, a monitor 31, such as a CRT provides a very narrow picture density display range (dynamic range), e.g. one tenth that of the negative film 2, so that the picture information of the negative film cannot sufficiently be displayed only by the normal inverting operation. By means of the inverse common logarithm, however, unneeded information of the negative film 2 is compressed, but not merely inverted, and effective information is relatively enlarged, so that the picture displayed on the monitor 31 can be very easily observed by an operator. In addition, it may be preferred to add a γ or color balance correction function (normalizing or standardizing function) to the logarithmic converting circuit 23 with respect to each kind of negative film. It may also be possible to add to the monitor 31 such functions as to display, by dividing the picture into three parts, as shown in FIG. 8, that is the original picture 31A, the automatically corrected picture 31B and final picture 31C corrected by the light pen 40, which can be alternatively displayed by switching a switching circuit.

Figure 9:
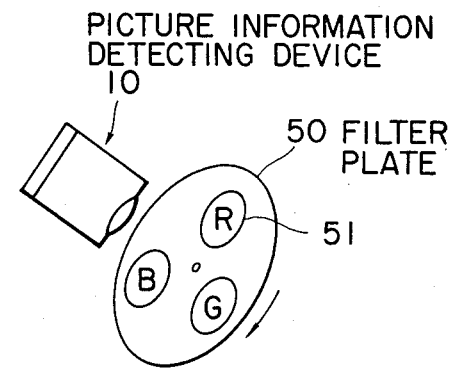
FIGS. 9 and 10 schematically show other examples of the picture detecting device used for this invention.
Figure 10:
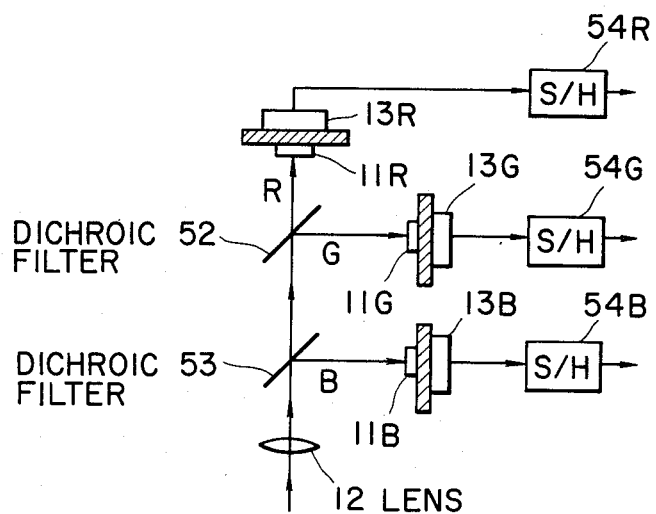

Furthermore, FIG. 9 will be available for the detection of the picture information by means of the picture information detecting device 10 inclusive of a two-dimensional image sensor. Referring to FIG. 9, a filter plate 50 provided with B-, G- and R-colored filters 51 which are located in front of the picture information detecting device 10 so as to thereby detect the information in synchronism with the rotation of the filter plate 50. In another aspect, as shown in FIG. 10, it may be possible to color-separate the light passing through a lens 12 by means of two dichroic filters 52 and 53, and to detect the colors separated into three colors B, G and R by image sensors 11B, 11G and 11R, respectively, and finally to process the detected colors through sample-and-hold circuits 54B, 54G and 54R. The detector of this type can respectively process these three colors in parallel, so that the high speed processing is advantageously enabled. Moreover, it is also possible to construct the detector by closely arranging a stripe filter provided with a BGR stripe or a mosaic filter provided with a BGR mosaic on the surface of the image sensor. In these cases, the stripe width of the stripe filter will be determined corespondingly by the width of the picture element of the image sensor, and the mosaic element of each color will have to be related to the sensor element for effectively detecting the picture information of the respective B, G and R colors.

Figure 11:
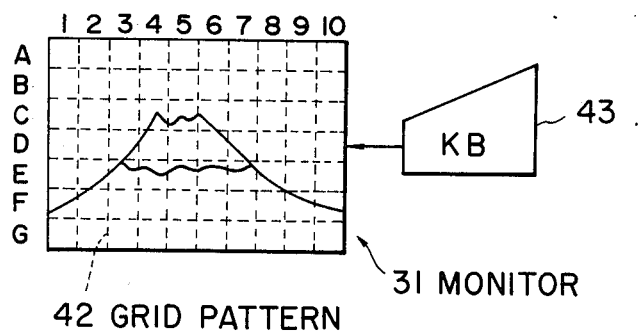
FIG. 11 shows another means for inputting position data according to this invention.

With the embodiment described hereinbefore, although the designation of the position of the main object of the picture displayed on the monitor 31 is performed by means of the light pen 40, such a designation, in another aspect, can be performed by a cursor selector, a mouse, a digitizer, a track ball, a touch tablet, a finger touch transparent panel or a stick controller, which is to be connected to the monitor 31. As shown in FIG. 11, in which a grid pattern 42 is displayed on the surface of the monitor 31, the designation of the position of the main object of the picture can also be performed by inputting an address corresponding to the position (1,2, ... 10 and A,B, ... G) by operating a keyboard 43. Furthermore, in combination of the specific shapes and the skin color detection, a picture of a man, particularly the face of a man, being a normal main object to be photographed, can be detected with extremely high precision even in a rough position designation. In the foregoing description, although the member of the position to be inputted is mentioned as one point, a plurality of points, two or more than two, can be inputted, whereby the respective points and the continuous range of the points are obtained as averaged density and the picture data is then corrected so that the thus obtained average density value is set to the density value set preliminarily. In this case, it is necessary to provide a key switch for instructing the start of the correction operation at the final stage of the input instructions.

Generally, there are many cases where the main object to be photographed is a man, and in these cases, the position of the face of the man is for example, designated externally of the monitor and the skin color position which directly represents the man is precisely detected from the picture data displayed on the monitor, whereby the picture data can be corrected so that the density and the color balance of the detected skin color area may be decided as the predetermined values. In such cases, since there may be many cases where the skin color area has some expansion, the correction will be made with reference to the density of the central portion of the skin color area. When a plurality of the skin color areas are observed, an average value of the respective densities of these areas is calculated and the picture data is then corrected with the predetermined value being thus obtained average value. In the art, a skin color detection method is well known, such as those disclosed in Japanese Laid-open Patent (KOKAI) No. 156624/1977 or No. 156625/1977. However, in the conventional skin color detection method, it is extremely difficult to precisely detect the color phase because of the difference due to the effect of the color of the light source or kinds of the negative film to be treated and because of the unevenness of the development treatment. In addition, since it is also difficult to detect the color phase in the case of the narrowing the color phase detecting range, a material, such as furniture provided with a color having a color hue resembling the skin color component, different from the man, being the main object to the photographed, is often misdiscriminated as the man and the incorrect procedure is performed in accordance with the mistaken information treatment. With these regards, according to this invention, since the position of the main object (face of a man) is designated externally of the monitor, the skin color can be precisely detected with a simple operation, thus being provided an improved photographic printing system provided with high precision of density and color correction ability.

According to the preferred embodiment of this invention described hereinabove, since a picture before and after the density and color correction can be confirmed by a monitor before obtaining a photographic picture by actually carrying out an exposure procedure, it is possible to confirm the effect of the correction as well as to obtain a desirably printed photograph. In a case of insufficient result of an automatic correction, the desirably printed photograph will be obtained by carrying out the exposure after obtaining a sufficient picture additionally corrected. Therefore, with respect to a specific scene such as a back-lighted scene, it is not necessary to carry out a test printing operation, thus eliminating loss of printing paper and shortening the processing time.

Figure 12:
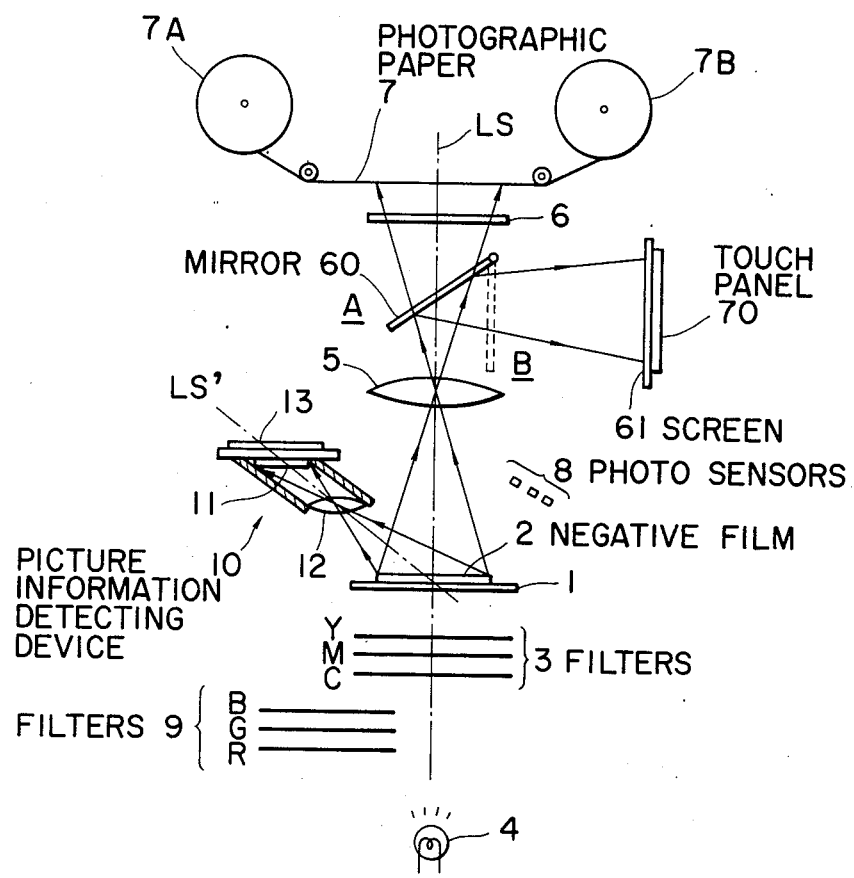
FIG. 12 shows a schematic view of another embodiment according to this invention.
Figure 13:
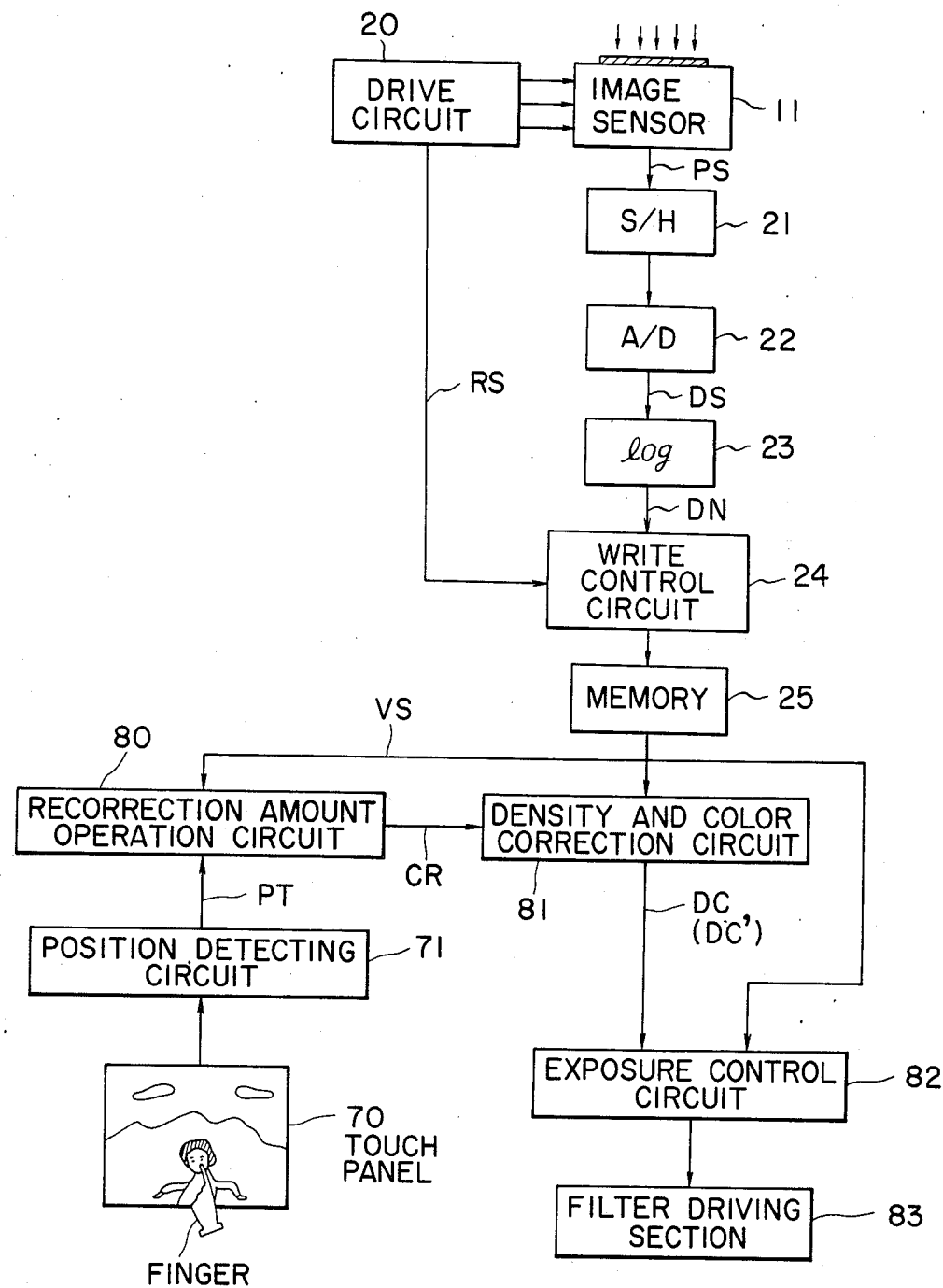
FIG. 13 shows a circuit diagram utilized for the embodiment shown in FIG. 12.

FIG. 12 shows another embodiment of the construction according to this invention in connection with the embodiment shown in FIG. 1, in which like reference numerals ae added to elements or means corresponding to those shown in FIG. 1, and a control unit for the system shown in FIG. 12 is diagramatically illustrated in FIG. 13. With this embodiment, a mirror 60 is located between the lens unit 5 and the black shutter 6 so as to be swingable between positions A and B; a picture image of the negative film 2 is projected on a screen 61 as a viewer when the mirror 60 is located at the position A. On the screen 61 is layered a touch panel 70 described hereunder so as to thereby externally designate the desired position (for example, a main object to be photographed, such as a man) of the picture image.

In a case where it is desirable to print a specific scene, such as a backlighted scene in which a difference in light exists between the main object and the background, it is necessary to lighten the main object by effecting a correction to obtain the most suitable density of the object on the photographic paper. In order to achieve this purpose, according to the embodiment of this invention, not only can the main object in the displayed picture be easily designated by touching the touch panel 70 with a finger as shown in FIG. 13, but also the thus designated position can be detected by a position detecting circuit 71 operatively connected to the touch panel 70. A signal PT regarding the designated position is transmitted from the position detecting circuit 71 into a recorrection amount operation cicuit 80, in which a signal for recorrecting the picture data of the designated position to picture data provided with a predetermined photographic paper printing density in response to the designated position signal PT is transmitted towards a density and color correction circuit 81. A signal DC' regarding the picture corrected in thus manner in the density and color correction circuit 81 with respect to the data of the main object is then inputted into an exposure control circuit 82, and the filters 3 are controlled or adjusted through a filter driving section 83 so as to thereby carry out an appropriate printing exposure operation suitable for the main object of the displayed picture.

Figure 14A:
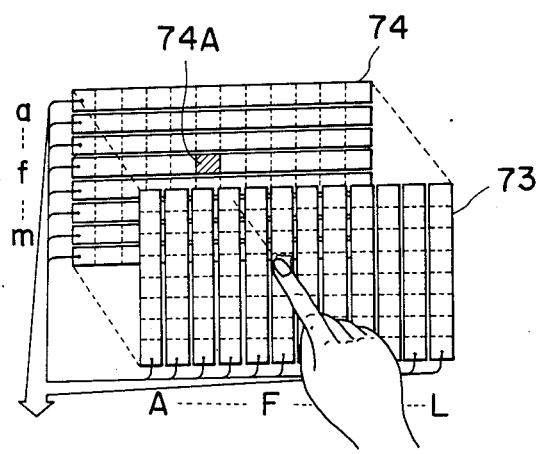
FIGS. 14A and 14B and FIGS. 15A and 15B are perspective views of touch panels to be used for the embodiment of this invention.
Figure 14B:
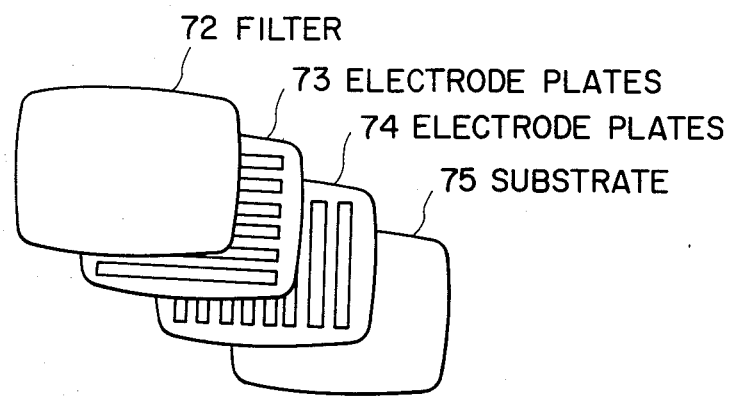
Figure 15A:
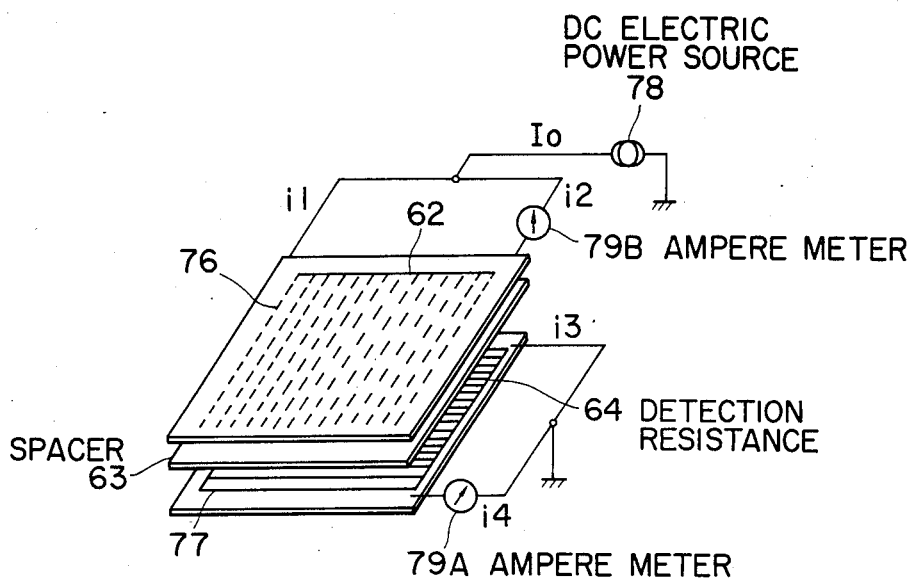
Figure 15B:
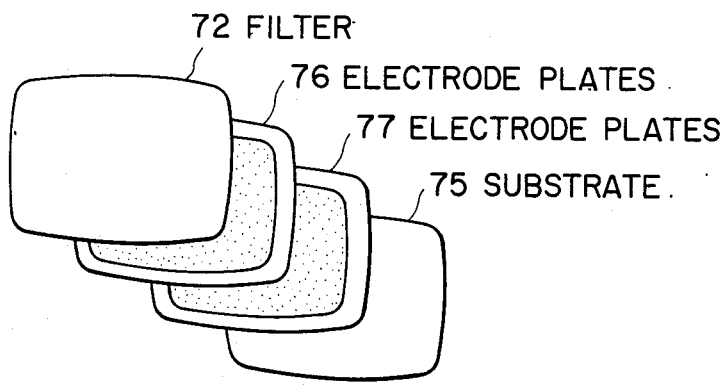

The touch panel 70 of the type such as a touch screen, touch sensor or perspective type finger touch input device can attain such a function wherein the information of the displayed picture can be inputted by touching with a finger the displayed surface on the touch panel 70, and accordingly, in a transparent electrode system, a digital method such as shown in FIGS. 14A and 14B and an analog method such as shown in FIGS. 15A and 15B will be taken account into consideration.

Regarding the digital method, the touch panel 70 shown in FIG. 14B comprises a filter 72, a substrate 75 and transparent movable and stationary electrode plates (or sheets) 73 and 74 consisting of plurality of vertically arranged electrode strips and horizontally arranged electrode strips, respectively and located with a small air gap to insulate them from each other between the filter 72 and the substrate 75. When a small pressing pressure (10~20 g, for example) is applied to the touch panel 70, i.e. the movable electrode plate 73, by a finger as shown in FIG. 14A, a portion 74A of the stationary electrode plate 74 contacts the pressed portion of the movable electrode 73 so as to thereby establish a conduction condition and the position information (X, Y addresses) can be obtained by the position detecting circuit 71 including a control circuit. Regarding the analog method, the touch panel 70 as shown in FIG. 15B comprises a filter 72, a substrate 75 and transparent thin film type electrode plates (or sheets) 76 and 77 located between the filter 72 and the substrate 75. A spacer 63 made of a material such as a pressure sensitive electro-conductive rubber is interposed with a small air gap between the electrode plates 76 and 77. Although this construction regarding the analog system is somewhat similar to that of the digital system, the former differs from the latter in the point that an equally distributed electro-conductivity is utilized to detect the current change at the contact point when one electrode plate is pressed to the other to contact each other. With the analog method, as shown in FIG. 15A, a constant d.c. electric power source 78 is applied between the electrode plates 76 and 77, and a current i4 generated at one of a detection resistance 64 of the electrode 77 is measured by an ampere meter 79A and a current i2 generated at one end of a detection resistance 62 of the electrode 76 is measured by an ampere meter 79B, so as to thereby detect the designated position. Alternative types of touch panels include: the infrared-ray type, ultrasonic type, electrostatic capacity type, etc., other than the transparent electrode type described hereinabove, and any one of these types can be of course utilized as a touch panel.

According to the embodiment of this invention described above, when the picture information regarding the B, G and R colors of the original film are stored in the memory 25 as mentioned hereinbefore, the picture information are inputted into the density and color correction circuit 81 as picture signals VS regarding the respective B, G and R colors so as to thereby extract the characterized information with respect to the maximum density, contrast, the minimum density and the like and the density and color correction amount DC are calculated by the method described hereinbefore with respect to the former embodiment. The thus obtained automatic correction amount DC is inputted into an exposure control circuit 82 in which the exposure control is performed on the basis of the picture signal VS.

Since the picture projected on the screen 61 as a viewer displays a picture to be printed, when it is presupposed that insufficient points exist in the displayed picture based on the automatic correction amount DC in view of the displayed picture, the operator touches the touch panel 70 to designate and input the necessary characterized position. At this time, the density and color correction circuit 81 operates through the recorrection amount operation circuit 80 to add or substract the correction amount CR with the predetermined value of the photographic paper printing density of the designated position to or from the automatic correction amount DC. The corrected result DC' is inputted into the exposure control circuit 82. Accordingly, the picture density which is needed to print the main object on the photographic paper is effected by operating the touch panel 70. In this procedure, the matrix positional relationship between the picture element data stored positions in the memory 25 and the touch panel 70 is preliminarily prescribed, and the position (X, Y addresses) of the main object designated on the touch panel 70 corresponds to the picture elements or picture element data of the main object on the memory 25. It is not always necessary that the resolution of the image sensor 11 and the touch panel 70 correspond to each other with a ratio of 1:1 with respect to the picture elements, and it is available to read out and use the picture data subjected to the picture surface division of the corresponding positions inclusive of the peripheral informations based on the designated position.

The thus decided amended picture signal DC' is inputted from the memory 25 into the exposure control circuit 82 together with the picture signal VS, and the filters 3 are controlled so as to print the photographic picture with the density and colors corresponding to the picture corrected by the exposure control circuit 82. The printing and exposing operations are performed under these conditions.

On the basis of the method described hereinbefore, for obtaining an exposure amount suitable for the subject scene from the picture information regarding the divided surfaces of the negative film as a method for determining the printing exposure amount based on the automatic correction amount DC, the exposure amount DC is expressed as follows by equation (1).

$$DC = a_1 \cdot Da + b_1 \cdot Dmax + c_1 \cdot Dmin + d_1 \quad (1)$$

where
- Da: LATD of the picture surface;
- Dmax: maximum density in the divided picture surfaces; and
- Dmin: minimum density in the divided picture surfaces.

A recorrection amount CR in a defined area including the periphery of the designated position is also expressed as an equation (2).

$$CR = a_2 \cdot Da + b_2 \cdot Dmax + C_2 \cdot Dmin + d_2 \quad (2)$$

Thus, the corrected result DC' will be obtained by adding the correction amount CR to the exposure amount DC as follows.

$$DC' = Ki \cdot DC + Kj \cdot CR \quad (3)$$

Accordingly the negative film 2 can be printed with the corrected exposure amount DC' by preliminarily providing an equation such as (3), in which the coefficients Ki and Kj are predetermined by an experiment in accordance with the numbers of the divided picture elements of the picture surface of the negative film.

At a time of photographing, the negative film 2 is developed to the colors of Y, M and C with respect to the colors B, G and R, respectively. The common logarithmic values of the inverse numbers of the antilogarithmic values of the light amounts of the Y, M and C colors are stored in the memory 25 through the operation of the logarithmic converting circuit 23, so that it may be said that the B, G and R colors of the complementary colors of Y, M and C of the object to be photographed are stored in the memory 25. Furthermore, when a plurality of positions are designated on the touch panel 70, an area in which the picture elements of these positions are continued and closed is determined as a designated area or is weighted in accordance with the designated orders. On the contrary, in a case where the main object is not clear or is uniformly distributed throughout the whole picture surface, the exposure amount will be controlled by the normal automatic correction amount DC without designating the positions.

In the foregoing embodiment, although the two-dimensional image sensor is preferably used for detecting the pictures of the respective picture elements, a one-dimensional line sensor can be used by which the picture information can be detected by moving the negative film 2 relatively with respect to the line sensor, or vice versa. Furthermore, the picture information is detected and the picture of the negative film is projected on the screen 61 by rotating the mirror 60, but these operations may be done by arranging a beam splitter in the light path.

Figure 6:
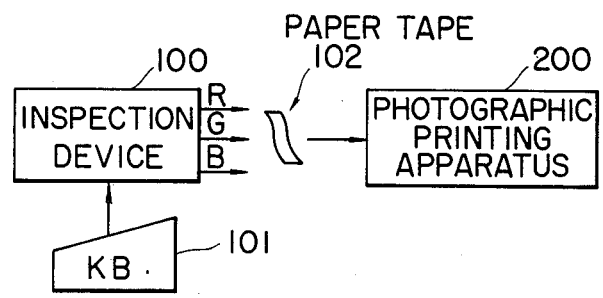
FIG. 6 schematically shows one example of a conventional photographic printing system.
Figure 16:
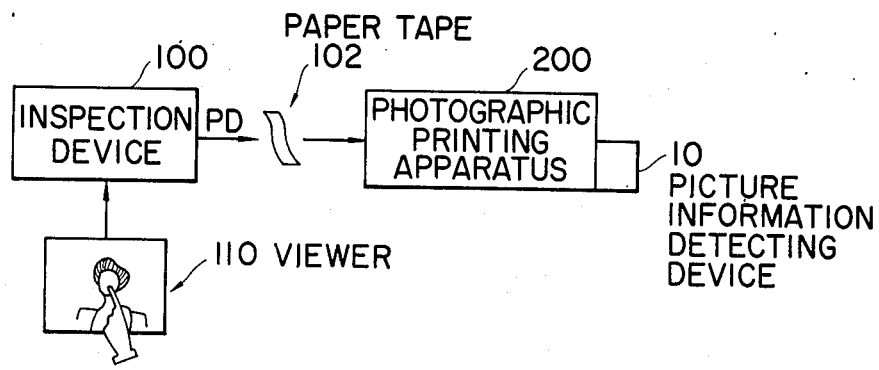
FIG. 16 shows a schematic diagram of one example according to this invention.

The viewer of the type described hereinbefore can be attached to the inspection device shown in FIG. 6. That is, FIG. 16 represents one example utilizing the viewer, in which a viewer 110 comprising a touch panel and a screen is operatively connected to the inspection device 100. The main object of the picture image of an inspection film is designated on the surface of the viewer 110 by the manner described before, whereby the position data (X, Y addresses) PD of the main object is inputted on such as a paper tape 102. In this manner, the position of the main object of the picture of a film to be printed is designated on the viewer 110 as occasion demands and the thus obtained position data PD is once inputted on the paper tape 102, and thereafter, the data PD is transferred to the photographic printing apparatus 200 at a printing time as data for representing the position of the main object. To the photographic printing apparatus 200 is attached the picture information detecting device 10 for detecting the photographic picture information of the type described hereinbefore to measure the picture of the film to be printed, and on the basis of the thus measured data and the position data PD, the exposure amount is operated so that the printing density of the designated position of the picture is most suitably determined. The operation of the exposure amount may also be obtained by correcting the picture data of the position corresponding to the position data PD to the predetermined amount (i.e. the density at the printing time is most suitable) after the exposure amount has been obtained in accordance with the measured data from the picture information detecting device 10. At any rate, in either one of these cases, the exposure amount can be decided so that the printing density of the picture position designated by the viewer 110 is most suitably obtained.

Although the correction information of the exposure operation with respect to the LATD-measurement at the inspection time is discriminated and given to the printing device in the conventional method, according to the photographic printing system of this invention of the construction described above, the discrimination of the correction informatin can be done only by the position data, so that the construction and the operation of the printing system can be simplified and the signal processing can also easily be made. Furthermore, since the correction operating equation in the conventional method for determining the exposure amount is treated on the basis of an assumption because the main portion of the picture surface is not clear (it is supposed that the main portion is generally statistically positioned at the central portion or the high density portion, for example), it occures often to erroneously discriminate the backlight as contrast and carry out a correction operation reversely. This disadvantageous fact constitutes a bar for the operation of the exposure amount obtained by the picture information detecting device consisting of an image sensor in which the picture is divided into a plurality of picture elements. Generally, in the normal LATD, an acceptable ratio is about 60~70% as a print; in use of the device for detecting the devided picture element information, that ratio is more than about 90%; using the inspection device, that ratio is about 95%; and according to the system this inventions, substantially 100% of the acceptable ratio can be obtained, whereby a repeated printing operation due to the undesirable condition of the density or colors can be substantially eliminated.

According to the embodiment of this invention, since the designation of the main object on the displayed picture surface with simple operation is made possible to weight the measured data of the subject position thereby to operate the data and automatically correct the exposure amount, a printed photograph with a suitable density can be easily obtained. In addition, a test printing procedure for the correction of a general light measuring system such as LATD-measurement with respect to a specific scene to be photographed such as a backlighted scene can be substantially, eliminated thus preventing the extra use of photographic paper and shortening the processing time. Moreover, no need of an expensive monitor such as CRT makes the entire system simple and compact, and thus economical. The designation of the position regarding only the frame of the specific scene, the subject portion of which is securely discriminated, makes the inspection printing operation effective and smooth. Furthermore, the conventional exposure correction procedure of an original film with respect to the LATD-measurement could be done only by a expert in the art. According to this invention, however, the inspection of the original film can even be done by a beginner easily and at a high speed. The workability can be improved and the precision of the exposure operation can also be substantially improved.

Figure 17:
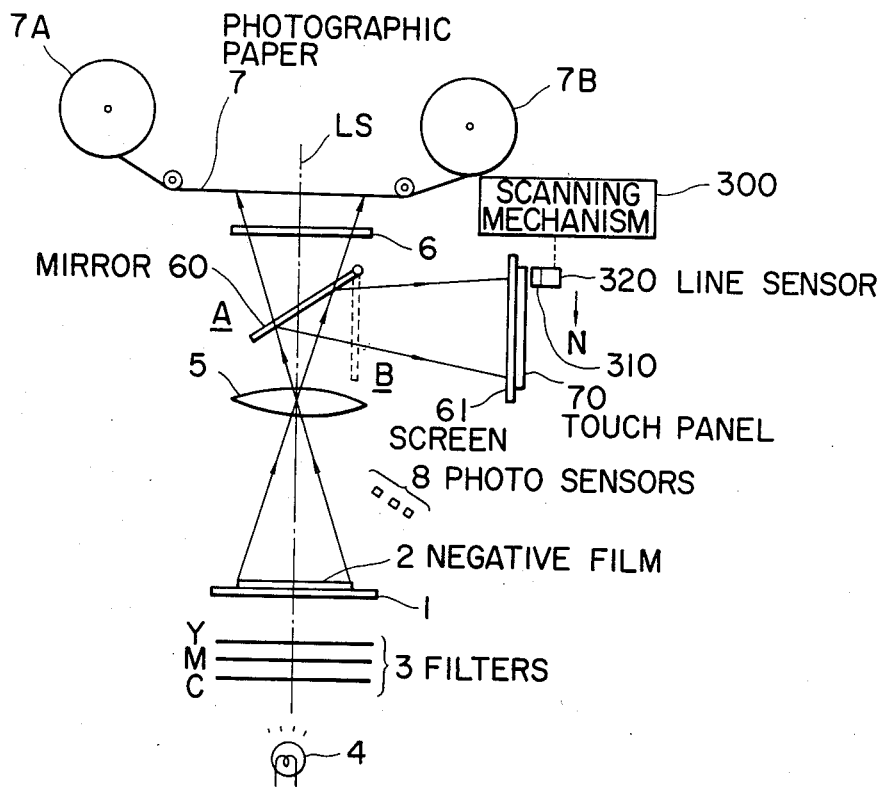
FIG. 17 shows a schematic diagram of another embodiment of a photographic printing system to which this invention is applied.

FIG. 17 shows a further embodiment of the photographic printing system according to this invention in connection with the embodiment shown in FIG. 12, in which like references are added to elements or means corresponding to those shown in FIG. 12.

Referring to FIG. 17, a mirror 60 is disposed between the lens unit 5 and the black shutter 6 to be swingable between the positions A and B. When the mirror 60 is disposed to the position B, the negative film 2 mounted on the negative film carrier 1 is lighted by the light from the light source 4 through the filters 3 with complementary colors of yellow, magenta and cyan colors. The light passed through the negative film 2 is exposed on the photographic paper 7 through the lens unit 5. On the other hand, when the mirror 60 is disposed to the position A, the picture image on the negative film 2 is projected on a screen 61 as a viewer through a field lens, not shown, as occasion demands. In place of the mirror 60, a beam splitter, which is not required to be swung; may be used. The projection of the picture on the screen 61 may be effected by using individual lens units without using the lens unit 5 for projecting the picture of the negative film 2 on the photographic paper 7. The touch panel 70 of the type described hereinafter is layered on the surface of the screen 61 so as to designate the desired position, i.e. the main object such as a man, of the projected picture externally of the touch panel 70.

Figure 18:
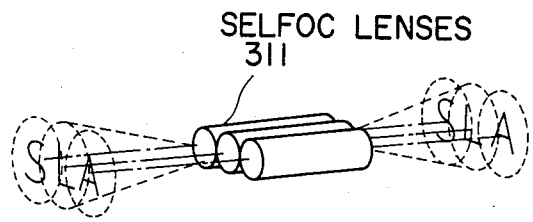
FIGS. 18 and 19 are perspective views showing Selfoc lens array adapted for this invention.
Figure 19:
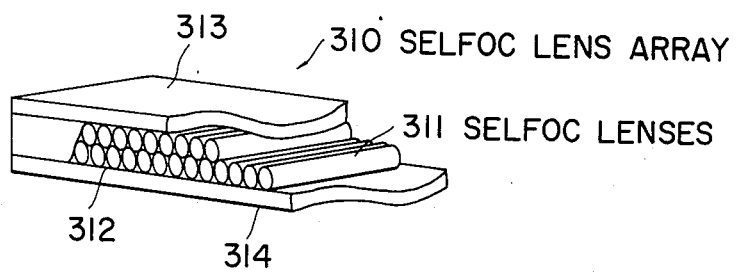

At the side end portion of the upper surface of the touch panel 70 is located a line sensor 320 consisting of a material such as amorphous silicon or CdS, forming a charge coupled device (CCD), which is moved in a direction of N as shown in FIG. 17 by a scanning mechanism 300 so as to thereby scan the projected picture on the touch panel 70 and detect the photographic picture information. In front of the line sensor 320 is located an equal magnification picture formation lens array 310 such as a rod lens array (Trade Name: Selfoc) which consists of two rows of several hundred specific glass fibers each of which has a diameter of about 1 mm and has different reflection ratios at the peripheral portion and the central portion thereof, these glass fibers being arranged in a flat rectangular this plate, for example, for preventing the damage between the touch panel 70 and the line sensor 320. FIG. 18 shows a picture formation condition by means of the Selfoc lenses 311 and FIG. 19 shows a perspective view in which a plurality of the Selfoc lenses 311 shown in FIG. 18 are bundled to constitute the Selfoc lens array 310 described before. Referring to FIG. 19, the respective Selfoc lenses 311 are bonded with black color resin 312 and held on both ends in a sandwiched form by FRPs 313 and 314. The Selfoc lens array 310 thus constructed is arranged in front of the line sensor 320.

Figures 20, 21:
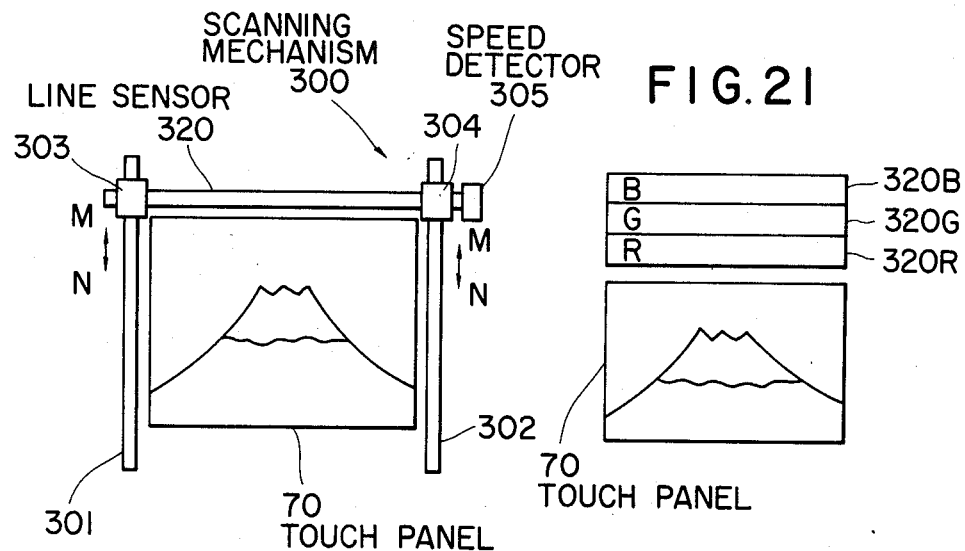
FIG. 20 shows a scanning mechanism of a line sensor in used condition.
FIG. 21 shows a construction of a line sensor.

The scanning mechanism 300 for the line sensor 320 is movable along guide rails 301 and 302 arranged in parallel with the moving direction as shown in FIG. 20, and at the both end portions of the line sensor 320 are located driving devices 303 and 304 which are movable along the guide rails 301 and 302 in directions of N and M, respectively. The scanning speed of the line sensor 320 is detected by a speed detector 305. In a case where the projected picture is a colored picture, since it is necessary to detect the picture by effecting the color separation of the picture into the primary three colors of B, G and R, three line sensors provided with BGR color filters 320B, 320G and 320R are arranged in parallel as shown in FIG. 21.

Figure 22:
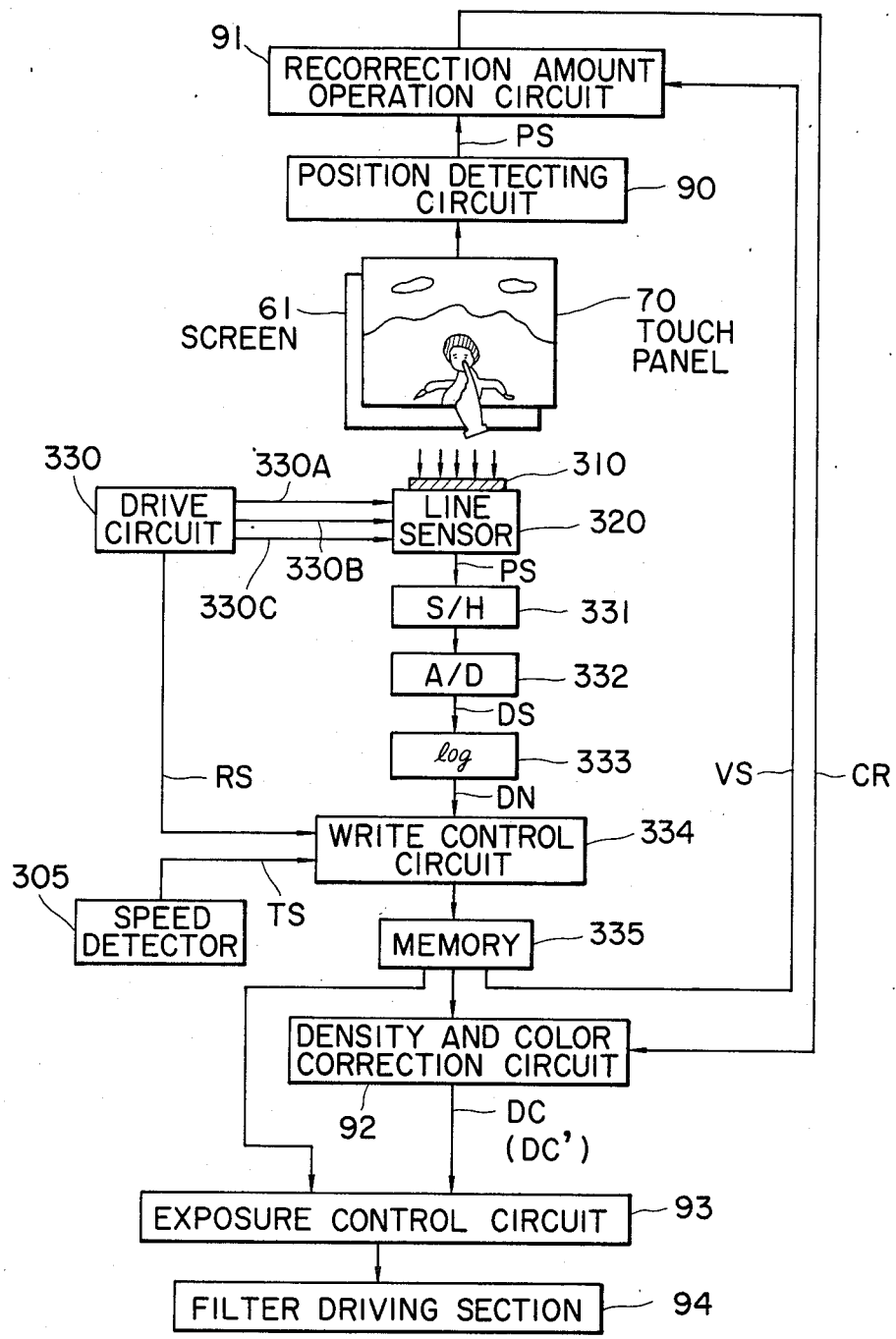
FIG. 22 shows a block diagram constituting a further embodiment according to this invention.

With the construction of this embodiment, the line sensor 320 is driven by driving signals 330A to 330C from a drive circuit 330 as shown in FIG. 22. Referring to FIG. 22, the light projected on the photographing portion is outputted from the output register of the line sensor 320 as the picture signal PS, which is then sample and held by a sampled-and-hold circuit 331 at a predetermined interval. The thus held information is converted by an A/D converter 332 into a digital signal DS. The digital signal DS from the A/D converter 332 is inputted into a logarithmic converting circuit 333 to carry out the logarithmic conversion, and after the conversion into the density signal DN, the converted density signal DN is written into a memory 335 through a write control circuit 334. In this case, into the write control circuit 334 are inputted a read-out speed signal RS transmitted in response to the driving speed of the drive circuit 330 and a speed signal TS from the speed detector 305 detecting the scanning speed of the line sensor 320. According to these signals RS and TS, the picture information with repect to one line is read out in response to the read-out speed and the scanning speed so as to thereby store the density data in the memory 335 with respect to the picture elements which are obtained by dividing the projected picture on the screen 61 into a plurality of ordered rows.

When it is necessary to detect the picture information of the picture projected on the screen 61 by means of the line sensor 320, the line sensor 320 is moved in the N direction with the predetermined speed by the scanning mechanism 300. The scanning speed of the scanning mechanism 300 of the line sensor 320 is detected by the speed detector 305 and a signal TS regarding the detected speed is inputted into the write control circuit 234. When the line sensor 320 is moved in the N direction, the transmitting light passing through the screen 61 on which the picture of the negative film 2 is projected and the touch panel 70 mounted on the screen 61 is then inputted into the line sensor 320 through the equal magnification picture formation lens array 310. The line sensor 320 then transmits the picture signal PS photo-electrically converted in response to the received light amount due to the drive signal from the driving circuit 330. In this case, since the read-out speed of the line sensor 320 by the drive circuit 330 corresponds to the pulse frequency of the drive signal, the picture projected on the screen 61 can be divided into a plurality of sequentially ordered picture elements 70A by the scanning line SL normal to the moving direction N as shown in FIG. 23A by driving the line sensor 320 with a relatively high speed with respect to the scanning speed of the line sensor 320. The picture signal PS regarding one scanning line SL from the line sensor 320 is inputted into the sample-and-hold circuit 331 and the thus held value is converted into the digital signal DS by the A/D converter 332, which is then converted into the density signal DN by the logarithmic converting circuit 333. The thus obtained density signal DN is inputted into the memory 335 through the write control circuit 334. In this process, since the read-out speed signal RS is inputted into the write control circuit 334 to obtain the relative relationship between the read-out and write-in operations, the density signals DN from the logarithmic converting circuit 333 are stored in the memory 335 in the order as the density data at positions corresponding to the divided picture elements of the picture projected on the screen 61. According to this manner, the density signals DN are stored in the memory 335 in an arrangement or order corresponding to the divided picture elements of the projected picture by carry out the scanning operation along the entire surface of the screen 61 with respect to the detection of the picture information regarding the respective one scanning line SL and the writing of the density data into the memory 335.

After the completion of the detection of the picture information of the picture projected on the screen 61 corresponding to one frame of the negative film 2 by the N-directional scanning of the line sensor 320 in accordance with the manner described hereinbefore, data as shown in FIG. 23B are stored in the memory 335 with respect to the original colors B, G and R, respectively. After this processing, the line sensor 320 may be moved in the M direction to the original position by the scanning mechanism 300 or the next frame detection may be started from the position at which the proceeding one frame detection has been completed. In a case where the line sensor 320 is returned to the original position, the operation will be more effectively performed by carrying out the pre-scanning operation such as the setting of the sensitivity during the outward trip and the real scanning operation of the picture detection during the inward trip.

The picture signal VS thus stored in the memory 335 is read out and inputted respectively into a recorrection amount operation circuit 91, a density and color correction circuit 92 and an exposure control circuit 93, wherein the read-out signal VS is corrected in the exposure control circuit 93 by the correction signal DS which is operated in the density and color correction circuit 92 and the filters 3 are driven by the determined exposure amount through the operation of a filter drive section 94.

In a case where a picture image to be displayed is a specific scene such as a backlighted scene in which a difference in the light exists between the main object to be photographed and the background thereof, it is necessary to light the main object to obtain the most suitable density of the main object on the print by applying the correction thereto. For this purpose, according to this invention, the main object in the picture displayed on the touch panel 70 can be easily designated by touching the same with a finger and the thus designated position can be easily detected by a position detecting circuit 90. A picture signal PS regarding the designated position from the position detecting circuit 90 is inputted into the recorrection amount operation circuit 91 to obtain a signal CR corrected by weighting the picture data so that the picture data of the subject position is provided with the predetermined density suitable for printing the picture on the printing paper in accordance with the inputted designated position signal PS. The corrected picture signal DC' corrected by the density and color correction circuit 92 mainly with respect to the main object to be photographed is inputted into the exposure control circuit 93, and the filters 3 are controlled so as to carry out the printing and exposing operations suitably corresponding to the main object of the picture displayed on the monitor such as touch panel.

According to the construction of this invention, as described hereinbefore, the characterized information, such as the maximum density, the contrast and the minimum density are extracted and the density and color amount DC to be corrected is calculated. The automatic correction amount DC is inputted into the exposure control circuit 93 to control the exposure amount on the basis of the picture signal VS.

An operator designates and inputs the characterized position by touching the touch panel 70 as occasion demands. At this time, the recorrection amount CR with the printing density of the designated position on the printing paper as the predetermined density is added to or subtracted from the automatic correction amount DC in the density and color correction circuit 92 through the processing of the recorrection amount operation circuit 91 and the corrected result DC' is inputted into the exposure control circuit 93. Accordingly, a picture density with which the main object is desirably printed on the printing paper can be obtained in accordance with the designating operation by means of the touch panel 70. In this procedure, it is not always necessary that the resolution of the image sensor 320 corresponds to that of the touch panel 70 with the ratio of 1:1 with respect to the respective picture element, and it is available to read out and utilize the picture data of the divided picture surface regarding the corresponding position inclusive of the peripheral information on the basis of the designated position.

The thus decided corrected picture signal DC' inputted into the exposure control circuit 93 together with the picture signal VS and the filters 3 are adjusted by the operation of the exposure control circuit 93 so that a photographic picture can be printed with density and color corresponding to the corrected picture. Under these conditions the printing and exposing operations are performed.

When it is necessary to designate a plurality of positions on the touch panel 70, if the picture elements of the designated positions are continuous and closed, the closed area will be deemed as a designated area or weighted in accordance with the designated order, and on the contrary, if the main object is not clear or evenly distributed throughout the whole picture surface, the exposure control may be performed with the normal automatic correction amount DC without designating the positions.

The viewer described hereinbefore can be used by attaching the same to the inspection device 100 of the type shown in FIG. 16. Namely, FIG. 24 represents on example in which a screen 110 constituting a viewer, a touch panel 120 layered on the surface and a line sensor 130 are attached to an inspection device 100. The picture densities of the picture elements of an inspection film is preliminarily detected by the line sensor 130 on the surface of the screen 110 by substantially the same manner as that described hereinbefore, and the detected values are stored in a memory, not shown. In this operation, the inspection film may be delivered and scanned to detect the density values of the respective picture elements by fixing the line sensor 130. During this inspection procedure, in case it is discriminated that the exposure amount for the printing operation should be corrected, the exposure amount is operated and corrected so that the most suitable printing density on the designated position can be obtained by designating the main object of the picture on the inspection film on the touch panel 120 by the manner mentioned before and in accordance with the thus designated position data (X, Y addresses) and the density data due to the light measuring operation which is stored in the memory, and the thus obtained corrected exposure amount PD is inputted on the paper tape 102. According to the manner described hereinabove, the position of the main object of the picture on the film to be printed is designated on the touch panel 120 as occasion demands and the corrected exposure amount PD corresponding to the position data is inputted on the paper tape 102, and thereafter, data representing the position of the main object and the most suitable exposure amount is given to a photographic printing apparatus 200. In the inspection device 100 to which the viewer is attached the exposure amount is determined so that the picture data regarding position designated on the touch panel 120 becomes the predetermined amount to obtain the most suitable printing density.

Although the photographic printing apparatus or system is described hereinabove with reference to the preferred embodiment, according to this invention, substantially the same manner or system will be applied to a recording technique on a recording medium such as magnetic disc film.

According to this invention, since light measuring data regarding the position of the main object to be photographed can be weighted and operated to automatically correct the exposure amount by designating the position of the main object on the displayed picture surface with an easy working, a printed photograph with a suitable printing density can be easily obtained. With respect to a specific scene such as backlighted scene, there is no need for test printing operation for the correction of a general light measuring system such as LATD measuring method, thus eliminating extra use of photographic paper and loss of processing time. In addition, since it is not necessary to utilize an extensive and voluminuous monitor such as CRT and a screen as a viewer, the touch panel and a line sensor are located in a laminated manner on substantially the same plane in the space, the shift between the picture elements on the picture surface and the designated positions can be substantially eliminated. Moreover, according to this invention, the photograph printing system is made compact and simple, so that an inspection printing operation can be performed effectively and smoothly only by designating the position of the specific scene frame in which the main portion can be securely discriminated. In the conventional technique, although only an expect can carry out the exposure correction operation of the original film with respect to the LATD measuring system, according to this invention, even a beginner can easily carry out the inspection of the original film with high effectiveness and high speed, thus workability and the precision in the exposure operation being extremely improved.

It should be understood that many modifications and adaptations of the invention will become apparent to those skilled in the art and it is intended to encompass such obvious modifications and changes in the scope of the claims appended hereto.

What is claimed is:

1. A photographic printing system of the type in which a picture image of an original film lighted by a light source is printed on a photographic paper, comprising:
   a two-dimensional image sensor for receiving a transmitting light through or reflected light from said picture image on the original film;
   a signal processing circuit for processing and storing a signal regarding the picture image from said two-dimensional image sensor;
   a correction amount operation circuit for extracting characterized information of the original film from data of the picture image stored in said signal processing circuit and calculating density and color correction amount of the picture image to be printed;
   a density and color correction circuit for correcting the picture image data stored in said signal processing circuit in accordance with the calculated density and color correction amount;
   a monitor for displaying a picture in response to the picture image data after the correction of said density and color correction circuit;
   a device for designating a position of the picture displayed on said monitor; and
   a density and color recorrection circuit for recorrecting the picture data of said density and color correction circuit so as make the density or lighted amount of the picture displayed on said monitor to a predetermined value, whereby a photographic printing operation is performed with the recorrected picture data of said density and color recorrection circuit.

2. The photographic printing system according to claim 1, wherein said position designating device designates only one position of the picture displayed on said monitor.

3. The photogrphic printing system according to claim 1, wherein said position designating device designates a plurality of positions of the picture displayed on said monitor and wherein said density and color recorrection circuit calculates an average value weighted by densities or lighted amounts of said plurality of designated positions to recorrect the picture signal from said density and color recorrection circuit in accordance with the calculated average value.

4. The photographic printing system according to claim 1, wherein said signal processing circuit is provided with a logarithmic converter and means for simultaneously processing inversion and compression of information regarding the picture image from said logarithmic converter.

5. The photographic printing system according to claim 1, wherein said signal processing circuit is provided with means for carrying out compression processing of the picture element data from said two-dimensional image sensor as picture surface division data.

6. The photographic printing system according to claim 1, wherein said monitor is provided with a grided monitoring surface which is to be designated by said position designating device.

7. The photographic printing system according to claim 1, wherein a picture based on the recorrected picture is displayed on said monitor.

8. A photographic printing system of the type in which a picture image of an original film lighted by a light source is printed on a photographic paper, comprising;
- a two-dimensional image sensor for receiving a transmitting light through or reflected light from said picture image on the original film;
- a signal processing circuit for processing and storing a signal regarding the picture image from said two-dimensional image sensor;
- a correction amount operation circuit for extracting characterized information of the original film from data of the picture image stored in said signal processing circuit and calculating density and color correction amount of the picture image to be printed;
- a density and color correction circuit for correcting the picture image data stored in said signal processing circuit in accordance with the calculated density and color correction amount;
- a monitor for displaying a picture in response to the picture image data after the correction of said density and color correction circuit;
- a device for designating one or more than one points or area consisting of subsequent points which represent characterized shape of a displayed picture in accordance with the picture date before and after the correction of said density and color correction circuit; and
- a density and color recorrection circuit for recorrecting the picture data of said density and color correction circuit so as to make the density or lighted amount of the displayed picture of the area designated by said area designating device to a predetermined value, whereby a photographic printing operation is performed with the recorrected picture data of said density and color recorrection circuit.

9. The photographic printing system according to claim 8, wherein said area designating device automatically designates a skin color of the displayed picture and designates a position of the skin color.

10. The photographic printing system according to claim 8, wherein said signal processing circuit is provided with means for carrying out compression processing of picture element data from said two-dimensional image sensor as picture surface division data.

11. A photographic printing system of the type in which a picture image of an original film lighted by a light source is printed on a photographic paper, comprising;
- a printing and exposure amount determining device for storing data regarding the original film is subjected to light measurement with respect to picture element obtained by dividing the picture of the original film and for extracting characterized information of the original film from said stored data thereby to determine the printing exposure amount;
- means for optically displaying the picture image of the original film;
- a touch panel means layered on a picture of said display means for outputting position information regarding a touched position of the displayed picture;
- means for correcting said printing exposure amount in accordance with said stored data for corresponding to said position information; and
- means for printing the original film with an exposure amount determined by said printing and exposure correction means.

12. The photographic printing system according to claim 11, wherein said printing and exposure determining device includes a two-dimensional image sensor for measuring light with respect to divided picture elements of the picture of the original film.

13. The photographic printing system according to claim 11, wherein said printing and exposure determining device includes a one-dimensional image sensor for measuring light with respect to divided picture elements of the picture of the original film.

14. A photographic printing system of the type comprising an inspection device for inspection a picture image of an original film and a photographic printing apparatus for printing the picture of the original film on a photographic paper after the inspection procedure of said inspection device, said inspection device being provided with means for optically displaying the picture image of the original film and touch panel means disposed on a picture surface of said display means for outputting position information regarding a touched position of the displayed picture, said photographic printing apparatus being provided with a printing and exposure determining unit for extracting characterized information of the picture divided into picture elements of the original film which is subjected to light measurement thereby to determine a printing exposure amount, means for correcting the printing exposure amount in response to said position information, and means for printing the picture of the original film with the exposure amount determined by said printing and exposure amount correction means.

15. The photographic printing system according to claim 14, whereby said position information is transferred to said photographic printing apparatus from said inspection device through an off-line means.

16. A photographic printing system of the type in which a picture image of an original film lighted by a light source is printed on a photographic paper comprising;
    a display means for optically displaying the picture image of the original film;
    a touch panel means layered on a picture surface of said display means for outputting position information of a designated position of the displayed picture;
    a printing and exposure amount determining picture elements obtained by dividing the picture on the picture surface on the display means into an ordered arrangement by light measurement manner and for obtaining the printing exposure amount of the picture from the stored data regarding the picture elements, said printing and exposure amount determining means comprising a line sensor for receiving a picture image projected on said display means, a driving circuit for driving said line sensor, a scanning mechanism located to be movable along said display means, and a signal processing circuit for requentially processing and storing picture signals from said line sensor in response to a moving speed of said line sensors;
    an exposure amount recorrection means for extracting characterized information of the picture from the stored data corresponding to the position information and recorrecting the printing exposure amount; and
    a printing means for printing the original film with the exposure amount determining by said exposure amount recorrection means.

17. The photographic printing system according to claim 16, wherein said signal precessing circuit comprises an A/D converter for converting said picture signal into a signal with digital amount, a logarithmic converting circuit for converting said digital signal from an anti-logarithm to a density value of the picture, and a memory for storing a density signal from said logarithmic converting circuit.

18. The photographic printing system according to claim 16, wherein said line sensor consists of a plurality of parallel line sensor elements of printing colors of blue, green and red and complementary colors of yellow, magenta and cyan.

19. The photographic printing system according to claim 16, wherein said line sensor consists of one line element on the surface of which three color strip filters are located.

20. The photographic printing system according to claim 16, wherein said line sensor is provided with an equal magnification picture formation lens array in front thereof.

21. A photographic printing system of the type comprising an inspection device for detecting a picture image of an original film and a photographic printing device for printing the original film on a photographic paper, said inspection device being provided with exposure amount recorrection means for extracting characterized information of the displayed picture from stored data corresponding to said position information, said photographic printing apparatus being provided with a printing means for printing said displayed picture on the photographic paper with a recorrected exposure amount determined by said exposure amount recorrection means; wherein said printing exposure means for optically displaying the picture of the original film a touch panel means layered on said display means for outputting position information regarding a position of the displayed picture designated by an operator, a printing and exposure amount determining means including a line sensor movable relative to said original film for measuring light and storing data with respect to picture elements obtained by dividing the picture and for determining the printing exposure amount for the picture from the stored data, and an amount or said recorrected exposure amount is transferred from said inspection device to said photographic printing apparatus through an off-line means.

* * * * *